Figure 1:
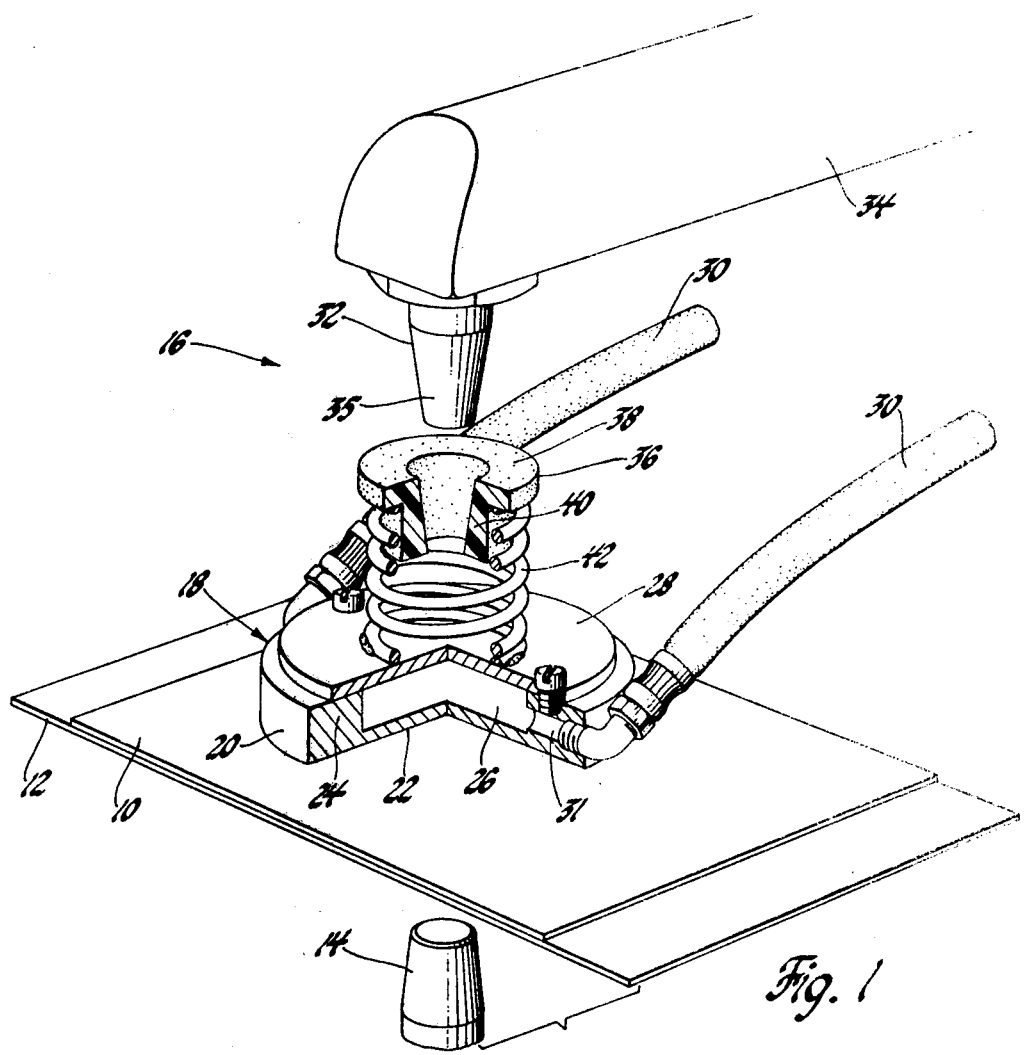

United States Patent [19]

Bakewicz et al.

[11] 4,208,568
[45] Jun. 17, 1980

[54] NON-MARRING SPOT WELD TIP

[75] Inventors: Frank J. Bakewicz, Grosse Pointe Woods; Patrick M. Bouchard; Patrick W. Pringle, both of Sterling Heights, all of Mich.

[73] Assignee: General Motors Corporation, Detroit, Mich.

[21] Appl. No.: 9,465

[22] Filed: Feb. 5, 1979

Related U.S. Application Data

[63] Continuation-in-part of Ser. No. 923,632, Jul. 11, 1978, abandoned, which is a continuation of Ser. No. 779,016, Mar. 18, 1977, abandoned.

[51] Int. Cl.² ............................................ B23K 11/10
[52] U.S. Cl. ............................... 219/86.31; 219/86.1; 219/119; 219/120
[58] Field of Search ............... 219/90, 86.31, 86.25, 219/78.12, 86.9, 91.2, 118, 119, 120

[56] References Cited

U.S. PATENT DOCUMENTS

| | | | |
|---|---|---|---|
| 2,045,523 | 6/1936 | Fassler | 219/86.9 |
| 2,179,693 | 11/1939 | Goldstein | 219/4 |
| 2,272,968 | 2/1942 | Dyer | 219/86.9 |
| 2,492,551 | 12/1949 | Brunberg | 219/86.31 X |
| 2,701,834 | 2/1955 | Moore | 219/120 X |
| 3,235,704 | 2/1966 | Rockwell | 219/118 X |
| 3,399,289 | 8/1968 | Sciaky | 219/120 X |
| 3,576,418 | 4/1971 | Sands | 219/86.31 |

Primary Examiner—Richard R. Kucia
Attorney, Agent, or Firm—Warren D. Hill

[57] ABSTRACT

To prevent buckling and indentation of a panel being spot welded, a welding tip including an electrode of large load bearing and heat conducting surface is used to spread the load and also efficiently cool the workpiece. The large area electrode is a water cooled copper disk of large mass connected to a support arm by a coil spring. An electrical contactor on the support arm releasably engages the electrode to supply welding current thereto when welding pressure is applied to the workpiece by the welding gun. When the pressure is removed, the coil spring separates the electrode from the contactor.

5 Claims, 5 Drawing Figures

NON-MARRING SPOT WELD TIP

This is a continuation-in-part of application Ser. No. 923,632, filed July 11, 1978 which in turn is a continuation of application Ser. No. 779,016, filed Mar. 18, 1977, now both abandoned.

This invention relates to resistance spot welding tips and especially to such a tip for producing a spot weld without indenting or buckling a panel being welded.

Conventional spot welding equipment comprises a pair of opposed tips engaging opposite surfaces of panels to be welded together. The area of the tip contacting the panel or the workpiece approximates the cross-sectional area of the weld nugget. The nugget area is influenced by the amount of weld energy supplied to the weld and other factors, but the order of magnitude of the weld nugget area is comparable of the area of the tip. Spot welding practice calls for force to be applied by the tips to the workpiece with the result that the indentation of the workpiece surfaces by the tips occurs. The tip indentation makes the spot weld undesirable for certain application because of its unsightly appearance. Thus if a roof panel of an automobile were to be spot welded in a region exposed to view, the indentation would be an unexceptable blemish and would have to be treated by filling with solder or epoxy prior to painting of the panel in order to present an attractive appearance.

In addition to electrode indentation, a second type of blemish which occurs with spot welding is buckling of the panel in the area surrounding the weld due to excessive heating of the panel by heat transfer from the molten weld nugget.

It is therefore a general object of the invention to provide a resistance spot welding tip which does not mar one surface of the panel being welded.

Another object of the invention is to provide a spot welding tip which avoids indentation and buckling on the surface of the panel being welded.

The invention is carried out by providing a resistance welding tip of workpiece contact area substantially greater than that of the weld nugget to be produced for distributing the load over a wide surface including regions of the panel not softened by the weld heating, and an arrangement to cool the electrode exceptionally well in order to cool the panel sufficiently to prevent panel buckling. In particular, a flexible coupling between the electrode and its support arm allows electrical contact to be made between the two when welding pressure is applied between the workpiece but permits separation of the electrode from intimate contact with the support arm when welding pressure is relieved.

Figure 2:
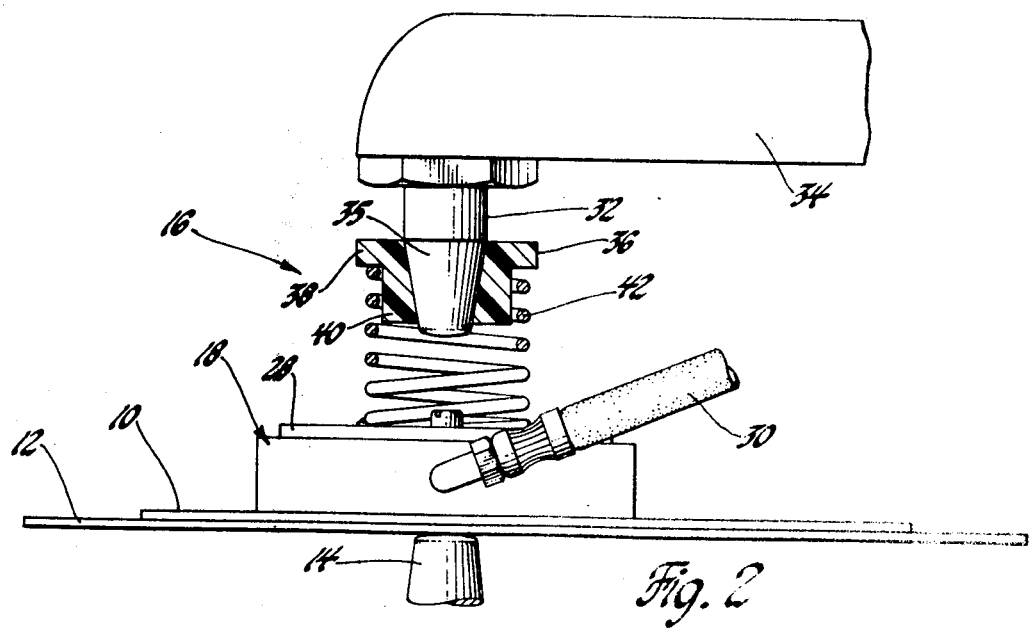
Figure 3:
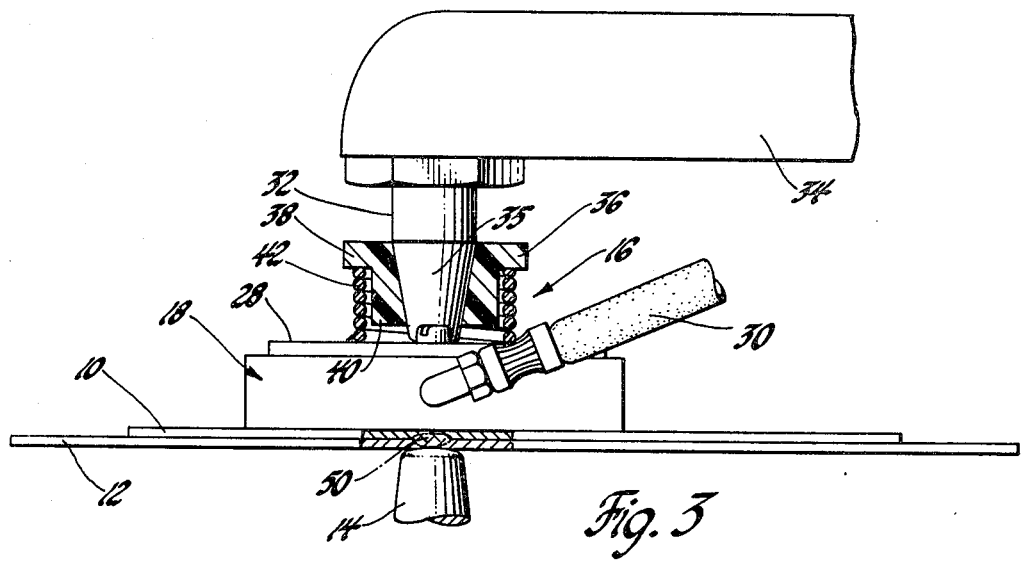
Figure 4:
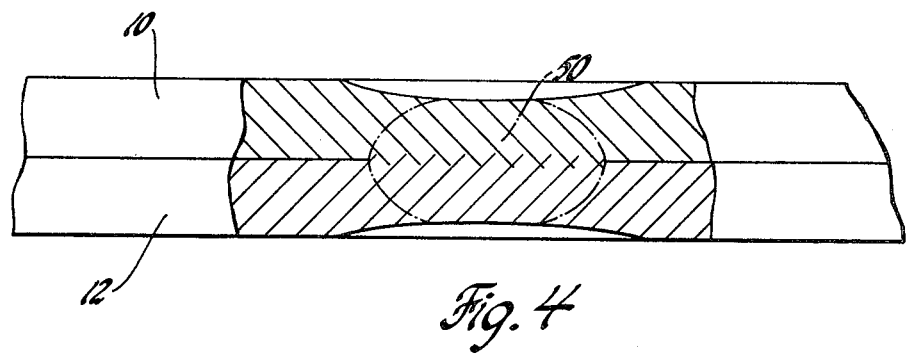
Figure 5:
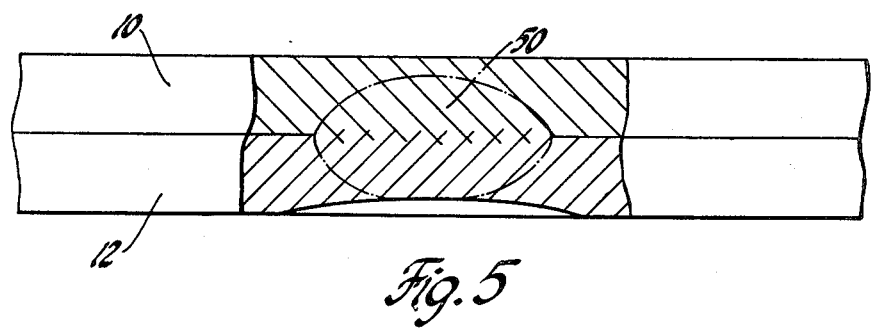

The above and other advantages will be made more apparent from the following specification taken in conjunction with the accompanying drawings wherein like reference numerals refer to like parts and wherein:

FIG. 1 is a perspective view of welding apparatus including a welding tip according to the invention, the tip being revealed in an exploded form, FIGS. 2 and 3 are elevational views of the apparatus of FIG. 1 with the tip assembled and shown in weld pressure released and weld pressure applied conditions, respectively, and FIGS. 4 and 5 are cross-sectional views of welds made by conventional tips and the weld tip according to the inventions, respectively.

Referring to FIGS. 1, 2 and 3 of the drawings, a pair of overlapping steel panels 10 and 12 to be spot welded are placed between a lower spot welding tip 14 and an upper tip 16 both supported by a resistance spot welding gun, not shown, which provides welding pressure by urging both tips against the panels and welding current when required. The lower welding tip 14 comprises a conventional water cooled electrode of small diameter, say 5 to 10 millimeters whereas the upper tip includes a disk-like electrode 18 having a workpiece engaging surface of large diameter, say 70 millimeters. The disk electrode 18 comprises a lower copper section 20 of large mass having a relatively thin bottom wall 22 and an upstanding peripheral rim 24 defining a cavity 26. A cover plate 28 of solid disk form is fastened over the lower member 20 to enclose the cavity 26. Water hoses 30 communicate through passages 31 in the rim 24 to circulate cooling water to the cavity 26 thereby cooling the electrode and particularly the central bottom wall 22 which bounds the cavity and engages the region of the panel 10 where a weld is to be made.

The tip 16 includes a contactor 32 secured to an upper support arm or anvil 34 through which welding current and force are supplied to the tip 16. The contactor 32 includes a depending frustro conical portion 35 formed in a Morse taper. A hollow nylon bushing 36 includes a flange 38 extending radially outwardly and a downwardly extending sleeve portion 40. The bushing 36 is formed with an internal Morse taper to allow quick mating connection to the contactor 32. The bushing 36 and the contact 32 are so proportioned that when assembled, the contactor portion 35 extends downwardly beyond the terminus of the sleeve 40. One end of a coil spring 42 is wrapped around and secured to the sleeve portion 40 of the bushing 36 and the other end is secured to the cover plate 28 of the electrode 18 by silver solder. The spring 42 is open wound and so dimensioned that normally the electrode 18 is spaced from the contactor 32 as shown in FIG. 2 but during welding when welding force is applied to the electrode tips to urge them against the workpiece, the spring 42 is compressed causing the contactor 32 to engage the cover plate 28 of the electrode 18 as shown in FIG. 3. The electrical contact between the contactor 32 and the electrode 18 being maintained only so long as the welding force is applied.

The primary function of the spring 42 is to allow flexible mounting of the electrode to the support arm 34 to facilitate automatic alignment of the electrode with the panel 10 in the event that the panel is positioned at an angle not normal to the axis of the contactor 32. It will be understood that the work engaging bottom surface of the electrode 18 is planar for operation on flat panels but for use on rounded panels it is preferably shaped to conform to the curvature thereof in order to maintain a wide area of contact between the electrode 18 and the panel 10.

A conventional spot welding gun would include a pair of opposed tips resembling the tip 14, the upper tip being mounted, of course, on the support arm 34. When a spot weld is made with the conventional tips, the result is that both panels 10 and 12, as shown in FIG. 4, are indented by the tips in the region of the weld nugget 50 and in addition, the panels will buckle due to the high weld heat. When, however, the welding tip 16, according to the invention is used, as shown in FIG. 5, the weld indentation occurs only on panel 12 due to penetration of the conventional tip 14 whereas the panel 10 remains flat due to the load being spread over a large area including portions of the panel not softened by the weld, and moreover the panel 10 does not buckle because of the efficient cooling by the electrode 18. In conventional spot welding practice, the support arm 34 and/or the welding tip are water cooled to some degree but not enough to prevent buckling of the panel, however, the tip 16 according to this invention achieves more efficient cooling. An example of weld parameters when an 0.047 inch inner panel is welded to an 0.035 inch outer panel is a welding force of 600 pounds, 9,000 ampers for a nugget diameter of 0.2 inch and a control sequence of squeeze—7 cycles, weld—10 cycles, hold—1 cycle and off—6 cycles at 60 Hz operation. Thus welds can be made at the rate of more than two per second.

In practice it has been found that although electrode indentation of panel 10 is prevented by this invention, a slightly raised spot may occur on the panel on the side adjacent electrode 18. This small blemish is readily removed by light sanding prior to painting of the surface to provide an acceptable appearance, i.e., it is free from any visible weld blemishes. By virtue of this invention, it is possible to make spot welds on exposed areas of articles such as automobile bodies where conventional spot welds are impractical because of their unsightly appearance. It will thus be seen that the tip according to this invention is an improved spot weld tip effective to spot weld surfaces without buckling or indentation of one of the panel surfaces.

The embodiments of the invention in which an exclusive property or privilege is claimed are defined as follows:

1. In a spot welding gun having a first conventional welding tip with a workpiece contacting surface comparable in area to the area of the weld nugget to be produced in the workpiece and a second welding tip carried by a support arm in opposition to the first welding tip, the second tip comprising; a conductive contactor secured to the support arm for carrying welding current, an electrode having a first surface for selective engagement with the said contactor and an opposed second surface having a workpiece engaging area many times larger than the weld nugget to be produced in the workpiece, a cooling cavity between the first and second surfaces of the electrode, means for circulating cooling water to the cavity whereby heat is extracted from the electrode and the workpiece, coupling means flexibly connecting the electrode to the support arm in a position normally spaced from the contactor and allowing contact between the contactor and electrode in response to welding gun pressure whereby the contactor and electrode are normally biased apart and are movable into contact during a welding interval, and the flexible coupling means allows the second electrode surface to intimately engage the workpiece for efficient thermal and electrical conduction and wide area load distribution.

2. In a spot welding gun having a first conventional welding tip with a workpiece contacting surface comparable in area to the area of the weld nugget to be produced in the workpiece and a second welding tip carried by a support arm in opposition to the first welding tip, the second tip comprising; a conductive contactor secured to the support arm for carrying welding current, an electrode having a first surface for selective engagement with the said contactor and an opposed second surface having a workpiece engaging area many times larger than the weld nugget to be produced in the workpiece, a cooling cavity between the first and second surfaces of the electrode, means for circulating cooling water to the cavity whereby heat is extracted from the electrode and the workpiece, coupling means comprising a coil spring having one end connected to the support arm and the other end connected to the electrode for flexibly connecting the electrode to the support arm in a position normally spaced from the contactor and allowing contact between the contactor and electrode in response to welding gun pressure whereby the contactor and electrode are normally biased apart and are movable into contact during a welding interval, and the flexible coupling means allows the second electrode surface to intimately engage the workpiece for efficient thermal and electrical conduction and wide area load distribution.

3. In a spot welding gun having a first conventional welding tip with a workpiece contacting surface comparable in area to the area of the weld nugget to be produced in the workpiece and a second welding tip carried by a support arm in opposition to the first welding tip, the second tip comprising; a conductive contactor secured to the support arm for carrying welding current, an electrode having a first surface for selective engagement with the said contact and an opposed second surface having a workpiece engaging area many times larger than the weld nugget to be produced in the workpiece, a cooling cavity between the first and second surfaces of the electrode, means for circulating cooling water to the cavity whereby heat is extracted from the electrode and the workpiece, coupling means comprising a coil spring aligned with the contactor and having one end connected to the contactor and the other end connected to the electrode and insulating means interposed between one end of the spring and the contactor or electrode to which it is connected, the coupling means flexibly connecting the electrode to the support arm in a position normally spaced from the contactor and allowing contact between the contactor and electrode in response to welding gun pressure whereby the contactor and electrode are normally biased apart and are movable into contact during a welding interval, and the flexible coupling means allows the second electrode surface to intimately engage the workpiece for efficient thermal and electrical conduction and wide area load distribution.

4. In a spot welding gun having a first conventional welding tip with a workpiece contacting surface comparable in area to the area of the weld nugget to be produced in the workpiece and a second welding tip carried by a support arm in opposition to the first welding tip, the second tip comprising; a conductive contactor secured to the support arm for carrying welding current, cylindrical electrode having a top end wall for selective engagement with the said contact and an opposed bottom wall having a workpiece engaging area many times larger than the weld nugget to be produced in the workpiece, a cooling cavity between and bounded by the top and bottom walls of the electrode, means for circulating cooling water to the cavity whereby heat is extracted from the electrode and the workpiece, the bottom wall of the electrode between the workpiece engaging area and the cavity being relatively thin in the region opposed to the first electrode to permit efficient transfer of heat from the region of the weld nugget to the cooling water, coupling means flexibly connecting the electrode to the support arm in a position normally spaced from the contactor and allowing contact between the contactor and electrode in response to welding gun pressure whereby the contactor and electrode are normally biased apart and are movable into contact during a welding interval, and the flexible coupling means allows the second electrode surface to intimately engage the workpiece for efficient thermal and electrical conduction and wide area load distribution.

5. In a spot welding gun having a first conventional welding tip with a workpiece contacting surface comparable in area to the area of the weld nugget to be produced in the workpiece and a second welding tip carried by a support arm in opposition to the first welding tip, the second tip comprising; a conductive contactor secured to the support arm for carrying welding current, an electrode having a first surface for selective engagement with the said contactor and an opposed second surface having a workpiece engaging area many times larger than the weld nugget to be produced in the workpiece, means for circulating cooling water to the electrode whereby heat is extracted from the electrode and the workpiece, coupling means flexibly connecting the electrode to the support arm in a position normally spaced from the contactor and allowing contact between the contactor and electrode in response to welding gun pressure whereby the contactor and electrode are normally biased apart and are movable into contact during a welding interval, and the flexible coupling means allows the second electrode surface to intimately engage the workpiece for efficient thermal and electrical conduction and wide area load distribution.

* * * * *